United States Patent Office
2,972,563
Patented Feb. 21, 1961

2,972,563

FUNGICIDAL CYCLOPENTANONES

Sidney B. Richter, Chicago, Ill., assignor to Velsicol Chemical Corporation, Chicago, Ill., a corporation of Illinois No Drawing. Filed Jan. 13, 1959, Ser. No. 786,456

10 Claims. (Cl. 167—30)

This invention relates to new compositions of matter. More specifically, this invention relates to chemical compounds of the general formula

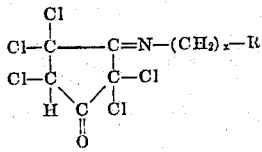

wherein $x$ is a whole number from 0 to 3 and R can be an unsubstituted phenyl, monohydroxyphenyl, monochlorophenyl, or dichlorophenyl radical. These new compounds have been found to be unusually active as pesticides, particularly as fungicides.

The compounds of this invention can be prepared readily by the condensation of hexachloro-2-cyclopentenone with the appropriate primary amine

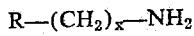

($x$ and R are as defined above). The reaction can be carried out with only two moles of amine for each mole of hexachlorocyclopentenone, but an excess of amine can be used if desired. The reaction is suitably carried out in an inert solvent, and the reaction mixture is heated at reflux temperature until the reaction is complete. The product can be readily isolated by distilling off the inert solvent and unreacted starting materials in vacuo. While the products obtained in this manner are often suitable for pesticidal use as such, they can be purified, for example, by recrystallization from a suitable solvent.

The hexachloro-2-cyclopentenone required as a starting material can be prepared by heating octachlorocyclopentene with concentrated sulfuric acid as described by Newcomer and McBee, J. Am. Chem. Soc., vol. 71, p. 946 (1949). The primary amines also required for the reaction are either chemicals of commerce or can be prepared readily by those skilled in the art. The primary amine to be used in the reaction is selected on the basis of the identity desired for $x$ and R in the final product. Thus, in order to obtain compounds according to this invention in which $x$ is 0, amines such as aniline, o-chloroaniline, m-chloroaniline, p-chloroaniline, 2,4-dichloroaniline, 3,4-dichloroaniline, 2,6-dichloroaniline, o-aminophenol, m-aminophenol, p-aminophenol, and the like are used. Compounds in which $x$ is 1 are obtained by using benzylamine or its derivatives such as o-chlorobenzylamine, 2,6-dichlorobenzylamine, α-amino-o-cresol, and the like. Compounds in which $x$ is 2 are obtained by using phenethylamine or its derivatives such as p-chlorophenethylamine, 2,4-dichlorophenethylamine, or p-hydroxyphenethylamine (tyramine). In a like manner, compounds in which $x$ is 3 are obtained by using 3-phenylpropylamine or its chlorinated and hydroxylated derivatives.

Compounds according to this invention in which R is an unsubstituted phenyl radical are obtained by using the primary amines wherein R is an unsubstituted phenyl group: aniline, benzylamine, phenethylamine, and 3-phenylpropylamine. Compounds in which R is a monochlorophenyl radical are obtained by using such amines as o-chloroaniline, m-chloroaniline, p-chloroaniline, m-chlorobenzylamine, p-chlorophenethylamine, 3-(o-chlorophenyl)propylamine, and the like. Compounds in which R is a dichlorophenyl radical are obtained by using such amines as 2,4-dichloroaniline, 2,5-dichloroaniline, 3,4-dichloroaniline, 3,5-dichloroaniline, 2,6-dichloroaniline, 2,6-dichlorobenzylamine, 2,4-dichlorophenethylamine, and the like. Similarly, compounds in which R is a monohydroxyphenyl radical are obtained by using such amines as o-aminophenol, m-aminophenol, p-aminophenol, α-amino-o-cresol, p-hydroxyphenethylamine, and the like.

The manner in which typical compounds of this invention can be prepared is illustrated in the following examples.

EXAMPLE 1

Preparation of the benzylimine

Hexachloro-2-cyclopentenone, M.P. 28° C., was prepared as described by Newcomer and McBee, J. Am. Chem. Soc., 71, 946 (1949). This ketone (29 g.; 0.1 mole) was dissolved in 140 ml. benzene in a 500-ml. round-bottomed flask fitted with a mechanical stirrer, reflux condenser, and dropping funnel. Benzylamine (22 g.; 0.2 mole) in 80 ml. benzene was added dropwise with stirring over a period of 70 minutes. The mixture was stirred at room temperature for 1 hour and then at reflux for 1 hour. The cooled solution was filtered, washed with water, and dried over calcium chloride. The solution was concentrated to about half its volume by distillation of part of the benzene in vacuo, and the concentrate was treated with heptane to precipitate 20 g. of product (55% of theory). Several recrystallizations of the product from heptane gave pure 3-benzylimino-2,2,4,4,5-pentachlorocyclopentanone, melting point 113–116° C.

Analysis for $C_{12}H_8Cl_5NO$.—Theory: C, 40.09%; H, 2.23%; Cl, 49.33%. Found: C, 39.90%; H, 2.23%; Cl, 49.27%.

EXAMPLE 2

Preparation of the p-hydroxyphenylimine p-Aminophenol (43.6 g.; 0.4 mole) in 400 ml. dioxane was added dropwise with stirring over a period of 1 hour to hexachloro-2-cyclopentenone (58 g.; 0.2 mole) dissolved in 200 ml. dioxane in a round-bottomed flask fitted with a mechanical stirrer, reflux condenser, and dropping funnel. The solution was refluxed for 4 hours and filtered. Most of the dioxane was then distilled off in vacuo to leave a tarry residue, which was treated with hot xylene. The precipitate which formed was filtered, recrystallized from a methanol-water mixture, triturated with water, and finally recrystallized from xylene to give 26 g. (36% of theory) of 3-p-hydroxyphenylimino-2,2,4,4,5-pentachlorocyclopentanone, melting point 204° (decomposition).

EXAMPLE 3

Preparation of the o-chlorophenylimine

A mixture of hexachloro-2-cyclopentenone (29 g.; 0.1 mole), o-chloroaniline (25.5 g.; 0.2 mole), and 220 ml. benzene was refluxed for 22.5 hours in a 500-ml., round-bottomed flask fitted with a reflux condenser. The solvent was then distilled from the mixture in vacuo to give a liquid residue which solidified to a dark purple solid on standing at room temperature for a week. The solid was extracted with ether, leaving an insoluble salt. The ether was distilled from the extract in vacuo to leave a solid residue, which was recrystallized from heptane and treated with Nuchar in acetone solution. The acetone was distilled off in vacuo to leave a yellow solid, which was recrystallized several times from heptane to give 13 g. (34% of theory) of light tan 3-o-chlorophenylimino-2,2,4,4,5-pentachlorocyclopentanone, melting point 164–167° C.

A wide variety of other useful compounds within the scope of this invention can be prepared in the manner detailed in the above examples. Given in the following examples are the particular primary amines required for reaction with hexachloro-2-cyclopentenone (identified hereinafter as "A") to give the indicated typical compounds of this invention.

EXAMPLE 4

2,4-dichloroaniline+A=3-(2,4-dichlorophenylimino)-2,2,4,4,5-pentachlorocyclopentanone.

EXAMPLE 5 m-Chloroaniline+A=3-m-chlorophenylimino-2,2,4,4,5-pentachlorocyclopentanone.

EXAMPLE 6 o-Aminophenol+A=3-o-hyrdoxyphenylimino-2,2,4,4,5-pentachlorocyclopentanone.

EXAMPLE 7 p-Chloroaniline+A=3-p-chlorophenylimino-2,2,4,4,5-pentachlorocyclopentanone.

EXAMPLE 8

3,5-dichloroaniline+A=3-(3,5-dichlorophenylimino)-2,2,4,4,5-pentachlorocyclopentanone.

EXAMPLE 9 m-Aminophenol+A=3-m-hydroxyphenylimino-2,2,4,4,5-pentachlorocyclopentanone.

EXAMPLE 10

2,5-dichloroaniline+A=3-(2,5-dichlorophenylimino)-2,2,4,4,5-pentachlorocyclopentanone.

EXAMPLE 11 o-Chlorobenzylamine+A=3-o-chlorobenzylimino-2,2,4,4,5-pentachlorocyclopentanone.

EXAMPLE 12

3,4-dichlorobenzylamine+A=3-(3,4-dichlorobenzylimino)-2,2,4,4,5-pentachlorocyclopentanone.

EXAMPLE 13

α-Amino-o-cresol+A=3-o-hydroxybenzylimino-2,2,4,4,5-pentachlorocyclopentanone.

EXAMPLE 14 p-Chlorophenethylamine+A=3-p-chlorophenethylimino-2,2,4,4,5-pentachlorocyclopentanone.

EXAMPLE 15

2,4-dichlorophenethylamine+A=3-(2,4-dichlorophenethylimino)-2,2,4,4,5-pentachlorocyclopentanone.

EXAMPLE 16 p-Hydroxyphenethylamine+A=3-p-hydroxyphenethylimino-2,2,4,4,5-pentachlorocyclopentanone.

EXAMPLE 17

3-(o-chlorophenyl)propylamine+A=3-[3-(o-chlorophenyl)propylimino]-2,2,4,4,5-pentachlorocyclopentanone.

EXAMPLE 18

3-phenylpropylamine+A=3-(3-phenylpropylimino)-2,2,4,4,5-pentachlorocyclopentanone.

EXAMPLE 19

Aniline+A=3-phenylimino-2,2,4,4,5-pentachlorocyclopentanone.

EXAMPLE 20

Phenethylamine+A=3-phenethylimino-2,2,4,4,5-pentachlorocyclopentanone.

The new compounds of this invention have been found to be unusually active as pesticides, particularly as fungicides. For example, the toxicity of candidate compounds to test spores was determined by the slide germination technique adopted by the Committee on Standardization of Fungicidal Tests of the American Phytopthological Society. Measured concentrations of spores were placed on glass slides in contact with various concentrations of the compound being tested. Three replicates were run at each concentration. The percentage germination of spores was then determined for each treatment after 24 hours' incubation at 72° F. Typical results are recorded in the following table.

| Compound | Concn., p.p.m. | Organism | Percent Spore Germination | | | ED50,[1] p.p.m. |
|---|---|---|---|---|---|---|
| Example 1 | 100 | Fusarium roseum | 0 | 0 | 0 | 32 |
| Do | 10 | Monilinia fructicola | 0 | 0 | 0 | 1.6 |
| Example 2 | 100 | F. roseum (F-40 strain) | 1 | 0 | 1 | 5 |
| Do | 10 | F. roseum (Potato strain) | 1 | 1 | 1 | 3.5 |
| Do | 100 | M. fructicola | 0 | | 0 | 2.4 |
| Example 3 | 100 | F. roseum | 0 | 0 | 0 | 15 |
| Do | 100 | M. fructicola | 0 | 0 | 0 | 32 |

[1] Effective dosage for 50% control in parts per million.

Experiments were also carried out for the control of bean rust on bean foliage. Pinto bean seedlings, grown under greenhouse conditions, were mounted on a special compound turntable and sprayed with the test compounds at various concentrations for 30 seconds at 30 pounds pressure. The plants were allowed to dry, inoculated with spore suspensions of the bean rust organism, Uromyces phaseoli, and placed in an incubation chamber for 24 to 48 hours. The plants were then removed, maintained under greenhouse conditions for 10 to 14 days, after which the number of rust postules on the leaves of each plant were then determined. Three replicates were run at each concentration. Typical results are recorded in the table below.

| Compound | Concn., p.p.m. | Number Postules per Plant | | | | Percent Control | ED95, p.p.m. |
|---|---|---|---|---|---|---|---|
| | | 1 | 2 | Total | Ave. | | |
| Example 1 | 100 | 10 | 29 | 39 | 20 | 96.5 | 80 |
| Control | | | | | 603 | | |
| Example 2 | 100 | 76 | 49 | 125 | 63 | 91 | 120 |
| Control | | | | | 737 | | |
| Example 3 | 100 | 13 | 33 | 46 | 23 | 97.8 | 54 |
| Control | | | | | 932 | | |

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, Fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylenepolyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to the formulations if desired. The manner in which typical pesticidal compositions according to this invention can be prepared is illustrated in the following examples. All quantities given are in parts by weight.

EXAMPLE 21

*Preparation of an emulsifiable concentrate*

The following ingredients are blended thoroughly until a homogeneous liquid concentrate is obtained. This concentrate is mixed with water to give an aqueous dispersion containing the desired concentration of active compound for use as a spray.

3 - benzylimino - 2,2,4,4,5 - pentachlorocyclopentanone _____ 25
Sodium lauryl sulfate _____ 2
Sodium lignin sulfonate _____ 3
Kerosene _____ 70

EXAMPLE 22

*Preparation of a wettable powder*

The following components are mixed intimately in conventional mixing or blending equipment and are then ground to a powder having an average particle size of less than about 50 microns. The finished powder is dispersed in water to give the desired concentration of active compound.

3-p-hydroxyphenylimino - 2,2,4,4,5 - pentachlorocyclopentanone _____ 75.00
Fuller's earth _____ 22.75
Sodium lauryl sulfate _____ 2.00
Methyl cellulose _____ .25

EXAMPLE 23

*Preparation of an oil-dispersible powder*

The following components are blended and ground as described in the previous example to give a powder which can be dispersed in oil to form a spray containing the desired concentration of active compound.

3-o - chlorophenylimino - 2,2,4,4,5 - pentachlorocyclopentanone _____ 70
Condensation product of diamylphenol with ethylene oxide _____ 4
Fuller's earth _____ 26

EXAMPLE 24

*Preparation of a dust*

The following ingredients are mixed thoroughly and then ground to an average particle size of less than about 50 microns to give a dust suitable for application with conventional dusting equipment.

3 - (2,4 - dichlorophenethylimino) - 2,2,4,4,5- - pentachlorocyclopentanone _____ 20
Talc _____ 80

EXAMPLE 25

*Preparation of a granular formulation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

3 - (3 - phenylpropylimino) - 2,2,4,4,5 - pentachlorocyclopentanone _____ 10
Fuller's earth _____ 66
Dextrin _____ 20
Sodium lignin sulfonate _____ 3
Kerosene _____ 1

When the compounds and compositions of this invention are used as fungicides to control or prevent plant diseases caused by fungi or bacteria, they are used in several ways, depending on the particular chemical, the nature of the disease, and the nature of the plant attacked. They may be used as preventive agents to form a toxic barrier between the inoculum and the host tissue, to inhibit the production of inoculum, or to destroy the inoculum before it reaches the site of infection. They may be used as eradicating agents to destroy the disease-producing organism or its inoculum on the host tissue or in the soil. They may be used as curatives or therapeutic agents to destroy the disease-producing organisms within the plant tissues, halt their growth, or inhibit the development of their toxins or counteract them. They may also be used as prophylactic agents to immunize plants against disease. The compounds of this invention can be useful in any one or more of the above ways, but since it is much easier to protect plants from disease rather than to cure disease, the chemicals are best used in the form of protectants. These protective chemicals can act to prevent sporulation and thus reduce or eliminate the inoculum necessary for the spread of a disease. They can also prevent spores from completing their germination or incubation stage so that no infection ensues. These eradicant chemicals, which can also be considered broadly as protectants, are used to destroy disease-producing organisms or their inoculum in the soil, in dead plant organs, or on living plant tissue. When used to treat soil or seed, these compounds are usually referred to as disinfectants or disinfestants. The compounds of this invention are also useful for the control of fungal growth on wood, plastics, textiles, and like materials.

When used for the control of plant diseases, the compounds of this invention can be used as seed treatments, soil treatments, or plant treatments. Many of the disease-producing bacteria and the fungi that cause blights, spots, and rots are carried on or in seeds, roots, bulbs, tubers, corms, or other seed stock that is purchased by growers. These disease-producing organisms can be destroyed by dipping the seed or planting stock in liquid formulations of the compounds of this invention. Many plant pathogens are also soil-borne, and the application of the active compounds to the soil is one of the useful methods for control or eradication of the organisms, particularly in greenhouses, cold frames, hotbeds, and seedbeds. Both solid and liquid compositions of the compounds of this invention can be used in such soil treatments. Plant treatments by chemicals in the form of liquid or solid fungicidal compositions are made on growing crops or on crop residues either to prevent the appearance or spread of diseases or to destroy the disease-causing organisms already present or both. This type of treatment is essential for plant protection from air-borne pathogenes and is also useful in controlling many seed- and soil-borne pathogenes that spread externally to the upper parts of plants. Such treatment includes the application of the active chemicals internally to prevent or destroy diseased conditions. The active compounds of this invention are applied by any of these methods in amounts sufficient to exert the desired pesticidal action. The amount of the active compound present in the pesticidal compositions as actually applied for destroying or preventing pest infestations varies with the type of application, the particular pests which are to be controlled, the purpose for which the treatment is made, and the like. Generally, the solid or liquid pesticidal compositions of this invention will contain from about 0.5% to about 90% of the active compounds.

I claim:

1. A method of destroying undesirable fungi on growing plants which comprises contacting said fungi with a fungicidal composition comprising an inert carrier and as the essential active ingredient, in a quantity which is toxic to said pests, a compound of the formula

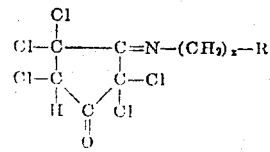

wherein $x$ is a whole number from 0 to 3 and R is selected from the group consisting of unsubstituted phenyl, monohydroxyphenyl, monochlorophenyl, and dichlorophenyl radicals.

2. A method as described in claim 1, wherein R is an unsubstituted phenyl radical.

3. A method as described in claim 1, wherein R is a monohydroxyphenyl radical.

4. A method as described in claim 1, wherein R is a monochlorophenyl radical.

5. A method as described in claim 1, wherein R is a dichlorophenyl radical.

6. A method as described in claim 1, wherein the compound is 3-benzylimino-2,2,4,4,5-pentachlorocyclopentanone.

7. A method as described in claim 1, wherein the compound is 3-p-hydroxyphenylimino-2,2,4,4,5-pentachlorocyclopentanone.

8. A method as described in claim 1, wherein the compound is 3-o-chlorophenylimino-2,2,4,4,5-pentachlorocyclopentanone.

9. A method as described in claim 1, wherein the compound is 3-(2,4-dichlorophenethylimino)-2,2,4,4,5-pentachlorocyclopentanone.

10. A method as described in claim 1, wherein the compound is 3-(3-phenylpropylimino)-2,2,4,4,5-pentachlorocyclopentanone.

References Cited in the file of this patent

Newcomber et al.: J.A.C.S., vol. 71, pp. 946–951 (1949).